United States Patent

Shekleton et al.

[11] Patent Number: 5,097,666
[45] Date of Patent: Mar. 24, 1992

[54] COMBUSTOR FUEL INJECTION SYSTEM

[75] Inventors: Jack R. Shekleton, San Diego; Michael W. Sledd, Vista; Steven S. Sachrison, LaJolla, all of Calif.

[73] Assignee: Sundstrand Corporation, Rockford, Ill.

[21] Appl. No.: 448,541

[22] Filed: Dec. 11, 1989

[51] Int. Cl.⁵ ............................................. F23R 3/30
[52] U.S. Cl. ........................................ 60/737; 60/740
[58] Field of Search ............... 60/737, 738, 740, 741

[56] References Cited

U.S. PATENT DOCUMENTS

| | | |
|---|---|---|
| 2,854,285 | 9/1958 | Barton . |
| 2,942,790 | 6/1960 | Starkey et al. . |
| 3,030,774 | 4/1962 | Henning et al. . |
| 3,091,926 | 6/1963 | Watkins . |
| 3,212,217 | 10/1965 | Furgason . |
| 3,521,824 | 7/1970 | Wilcox . |
| 3,820,571 | 6/1974 | Grier . |
| 3,915,387 | 10/1975 | Carvel et al. ............ 60/737 |
| 3,937,011 | 2/1976 | Carvel et al. ............ 60/737 |
| 3,961,475 | 6/1976 | Wood ........................ 60/738 |
| 4,324,112 | 4/1982 | Fujiwara et al. . |
| 4,526,151 | 7/1985 | Tateishi et al. . |
| 4,590,768 | 5/1986 | Halvorsen et al. . |

FOREIGN PATENT DOCUMENTS 335978 10/1989 European Pat. Off. ........... 60/737
63721 3/1989 Japan .................................... 60/737

Primary Examiner—Richard A. Bertsch
Assistant Examiner—Timothy S. Thorpe
Attorney, Agent, or Firm—Wood, Phillips, Mason, Recktenwald & Van Santen

[57] ABSTRACT

In order to achieve ignition at altitude, particularly in relatively small combustors (10) with low fuel flow rates, a fuel injection system (20) includes an air nozzle (26), a fuel nozzle (28), and an air assist tube (34). The fuel nozzle (28) is disposed in a manner so as to direct fuel through the air nozzle (26) and includes a fuel metering orifice (30) or capillary tube (32) to control fuel flow therethrough. The air assist tube (34) is integrally associated with the fuel nozzle (28) downstream of the fuel metering orifice (30) or capillary tube (32) to accelerate fuel flowing through the fuel nozzle (28). With this arrangement, the air nozzle (26) may comprise an opening in a combustor wall (14) defining a combustion chamber (12) of a turbine engine combustor (10) wherein a combustor case (16) surrounds the combustor wall (14) to define an air flow path 18 in communication with a compressed air source whereby compressed air flows through the opening (26) and into the combustor (10) along with fuel from the fuel nozzle (28) and air from the air assist tube (34).

3 Claims, 1 Drawing Sheet

COMBUSTOR FUEL INJECTION SYSTEM

FIELD OF THE INVENTION

The present invention relates to a combustor for a turbine engine and, more particularly, to a combustor fuel injection system for high altitude starting.

BACKGROUND OF THE INVENTION

At high altitude, it is typical for turbine engine combustors of auxiliary power units to have very low fuel flow rates. This is particularly true during low speed operation such as those which exist when the auxiliary power unit is being started even if all of the available fuel is directed through a pressure atomizing fuel injector of the most efficient type. For instance, even if an impingement injector is utilized, there is difficulty in achieving a satisfactory spray for ignition at low fuel flow rates.

In addition, this difficulty is still more severe with highly viscous fuels, and it is known that directing all of the fuel through a single start injector means considerable variations of air/fuel about the combustor. As a result, air loading is considerably higher, i.e., ignition and combustion are more difficult, than if fuel was uniformly introduced through all of the injectors.

Generally speaking, at typical low speeds air loading is very nearly linear with engine speed which means that at a given altitude ignition is extremely speed related. Thus, for instance, it's approximately twice as difficult to achieve ignition at 40,000 feet and at five percent speed from the kinetic viewpoint than at ten percent speed. As for altitude relatedness, and by way of example, at 50,000 feet it's nearly three times as difficult to achieve ignition at five percent speed from the kinetic viewpoint than at five percent speed at 40,000 feet.

Therefore, it is most desirable from an ignition reliability viewpoint to initiate ignition at the lowest possible engine speed. This is even more the case as altitude increases but, using conventional pressure atomizing injectors, even of the efficient impingement type, it is essentially impossible to achieve good atomization without gross overfueling. Of course, the overfueling is undesirable inasmuch as it also renders the air loading much higher than is desirable for reliable ignition.

Still further, as the engine accelerates, air loading increases rapidly up to a certain speed level. Thus, even if ignition can be achieved at, e.g., five percent speed, it is quite possible that flameout could occur at or near the air loading "worst case" operation level. By way of example, the conditions for burning may be over three times more difficult at the critical speed level.

In order to maximize altitude starting and operation, it is desirable to transfer to the main fuel at the lowest possible speed. This follows because the conditions for burning with a start injector will be worse than for the main fuel at the previously mentioned "worst case" or critical speed. However, this must also take into account the number of injectors for the main fuel relative to the total required fuel flow rate.

In addition, the fuel manifold head must be considered since it is necessary to maintain reasonable fuel distribution to all of the injectors for the main fuel so that air loading is not unduly increased. However, in so doing, the pressure drop required across the fuel metering orifices may become very large with the result that the fuel metering orifices may necessarily become very small.

It is well recognized that these can become critical parameters that require sensitive balancing to meet performance objectives.

The present invention is directed to overcoming one or more of the foregoing problems and achieving the resulting objectives.

SUMMARY OF THE INVENTION

It is a principal object of the present invention to provide a combustor for a turbine engine having a unique fuel injection system. It is a further object of the present invention to provide a fuel injection system having an air assist feature to accelerate fuel flowing therethrough. It is yet another object of the present invention to provide a fuel injection system in which the air assist feature is selectively operable.

In an exemplary embodiment of the present invention, the fuel injection system is a portion of a combustor for a gas turbine engine. The combustor has a combustion chamber defined by a combustor wall surrounded by a combustor case defining an air flow path therebetween which is in communication with a source of compressed air. As for the fuel injection system of the invention, it advantageously comprises a fuel manifold in communication with a plurality of fuel injectors in the combustor wall.

More specifically, the fuel injection system includes air nozzle means, fuel nozzle means, and air assist means. The air nozzle means may typically comprise an opening in the combustor wall in communication with the air flow path, and the fuel nozzle means is opposite the opening and in communication with a source of fuel, i.e., disposed in a manner so as to direct fuel from the source through the opening in the combustor wall. In addition, the air assist means is integrally associated with the fuel nozzle means for accelerating fuel flowing therethrough.

In this connection, the fuel nozzle means includes fuel metering means integrally associated therewith and typically comprising either a fuel metering orifice or a capillary tube. The fuel metering means is adapted to control fuel flow through the fuel nozzle means. With this arrangement, the air assist means is integrally associated with the fuel nozzle means at a point located downstream of the fuel metering orifice or the capillary tube.

In a highly preferred embodiment, the fuel nozzle means comprises a fuel supply tube disposed in coaxial relation to the air nozzle means or opening. It is also advantageous for the air assist means to comprise either an air assist tube disposed about the fuel supply tube or an air assist tube in communication with the fuel supply tube. In either case, the air assist tube is in communication with a source of compressed air for achieving the acceleration of fuel through the fuel supply tube.

In a most highly preferred embodiment of the invention, the air assist means is selectively operable for accelerating fuel particularly during turbine startup and on demand. In other words, means are provided for selectively directing compressed air to the air assist tube comprising the air assist means only when needed. At other times, the fuel injection system is adapted to direct fuel only from the fuel supply tube and air only from the air flow path through the opening in the combustor wall.

In one embodiment, the air assist tube is disposed about the fuel supply tube in coaxial and radially spaced relation. The air assist tube of this embodiment has an outlet end adjacent an outlet end of the fuel supply tube and is formed with the outlet end having a restricted cross sectional area relative to the remainder of the air assist tube. In another embodiment, the air assist tube is simply in communication with the fuel supply tube at a point upstream of the fuel metering orifice or capillary tube.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
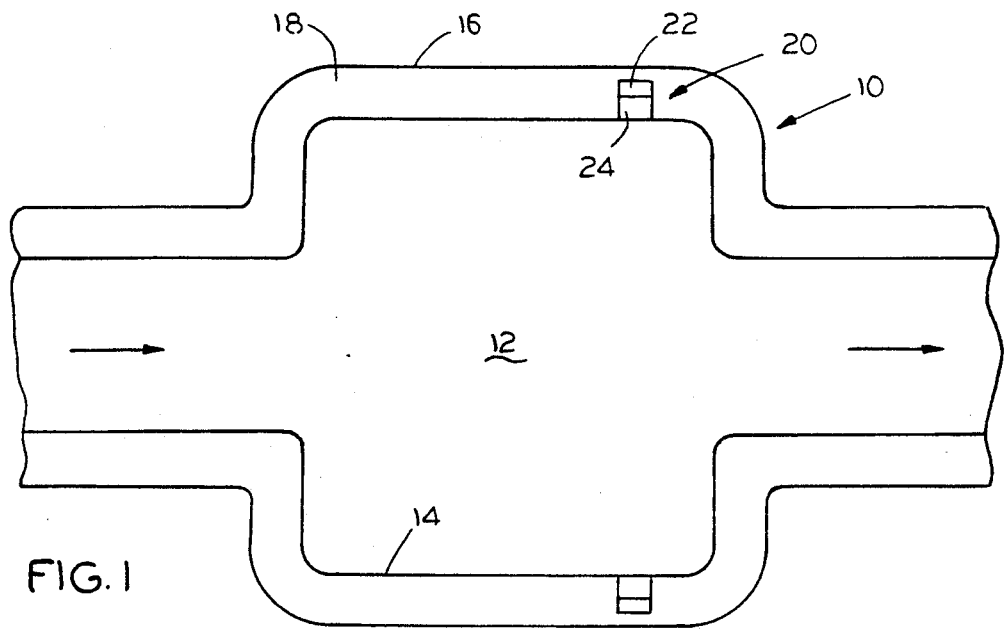
FIG. 1 is a very schematic, generally cross sectional view of a combustor having a fuel injection system in accordance with the present invention.

Referring to the drawings, and first to FIG. 1, the reference numeral 10 designates generally a combustor for a gas turbine engine (not shown) having a combustion chamber 12 defined by a combustor wall 14. It will be seen that the combustor wall 14 is surrounded by a combustor case 16 to define an air flow path 18 therebetween, i.e., the space between the combustor wall 14 and the combustor case 16 may typically be in communication with a source of compressed air such as a rotary compressor or the like (not shown). In addition, the combustor 10 has a fuel injection system generally designated 20 comprising a fuel manifold 22 in communication with a plurality of fuel injectors 24 associated with the combustor wall 14.

Figure 2:
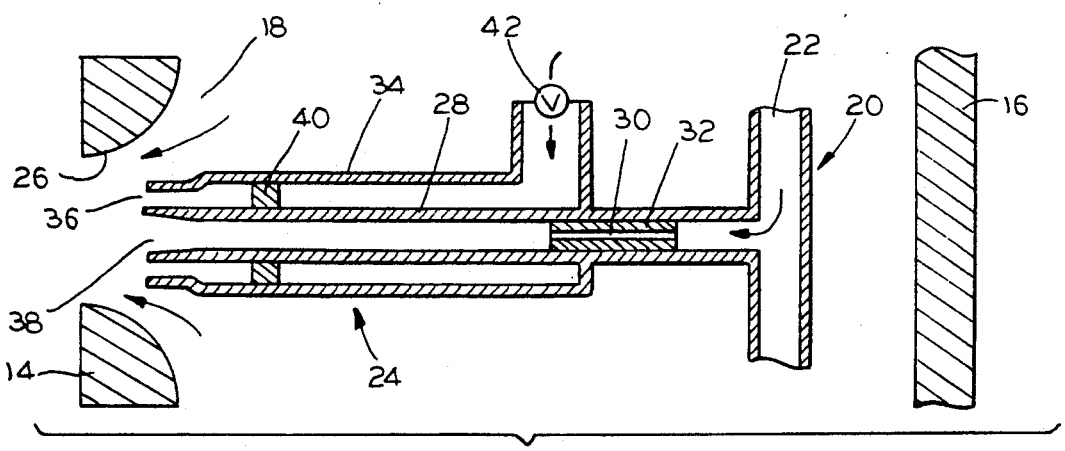
FIG. 2 is an enlarged cross sectional view illustrating details of a first embodiment of fuel injection system for a combustor.

Referring now to FIG. 2, the fuel injection system 20 includes air nozzle means in the form of an opening 26 in the combustor wall 14 which is in communication with the air flow path 18. The air flow path 18 is, in turn, in communication with a source of compressed air as previously described. In practice, the combustor wall 14 will include a plurality of openings 26 inasmuch as there will be a plurality of fuel injectors 24 associated with the combustor 10 to provide uniform air/fuel distribution therewithin.

Still referring to FIG. 2, the fuel injection system 20 also includes fuel nozzle means in the form of a fuel supply tube 28. It will be appreciated that the fuel supply tube 28 is in communication with a source of fuel (not shown) as through the fuel manifold 22 and is disposed so as to be in coaxial relation to the air nozzle means or opening 26 in a manner allowing fuel to be directed from the source through the air nozzle means or opening 26 substantially as shown. In addition, the fuel supply tube 28 includes fuel metering means for controlling fuel flow therethrough, i.e., into the combustion chamber 12.

In this connection, the fuel metering means advantageously comprises a fuel metering orifice 30 within the fuel supply tube 28. This fuel metering orifice 30 may be provided in any of a number of ways that will be apparent to those skilled in the art. In the embodiment illustrated in FIG. 2, the fuel metering orifice 30 is in a capillary tube 32 disposed within the fuel supply tube 28.

Still referring to FIG. 2, the fuel injection system 20 also includes air assist means in communication with a source of compressed air. The air assist means comprises an air assist tube 34 integrally associated with the fuel supply tube 28 downstream of the fuel metering means, i.e., the capillary tube 32 having the fuel metering orifice 30 therewithin. With this arrangement, the air assist tube 34 causes fuel to be accelerated through the fuel supply tube 28.

Since both fuel and air pass through the opening 26, it can be considered a fuel/air nozzle through which air from the air flow path 18 as well as fuel from the fuel supply tube 28 pass. More specifically, the air and fuel together with air from the air assist tube 34 all pass through the fuel/air nozzle 26 into the combustion chamber 12 of the combustor 10. By placing a plurality of fuel injectors 24 about the wall of the combustor 10, it is possible to achieve a uniform fuel/air distribution within the combustion chamber 12.

As will further be appreciated, the air assist tube 34 is generally coaxial with and radially spaced from the fuel supply tube 28 in the embodiment illustrated in FIG. 2. It will also be seen that the air assist tube 34 has an outlet end as at 36 adjacent an outlet end 38 of the fuel supply tube 28 and is formed such that the outlet end 36 has a restricted cross sectional area, i.e., restricted relative to the remainder of the air assist tube 34 upstream of the outlet end 36. In order to maintain spacing of the tubes 28 and 34, spacers 40 may be provided at a point upstream of the outlet ends 36 and 38 of the respective tubes 28 and 34 substantially as illustrated.

Still referring to FIG. 2, the fuel metering means is positioned to control fuel flow through the fuel supply tube 28 upstream of the fuel/air nozzle 26. It will also be appreciated that the fuel metering means, i.e., the fuel metering orifice 30 in the capillary tube 32, controls fuel flow upstream of the outlet end 38 of the fuel supply tube 28 and upstream of the outlet end 36 of the air assist tube 34. Since the air assist tube 34 carries pressurized air, it creates a suction at the outlet 38 of the fuel supply 28 to accelerate fuel flow therewithin.

Since the air assist is not always required in practice, a suitable valve 42 may be provided to render it selectively operable by means of a remote control arrangement. Thus, pressurized air can be selectively provided to the air assist tube 34 where it may be directed toward the fuel/air nozzle 26 upstream thereof along with fuel flowing through the fuel supply tube 28 for injection of a fuel/air mixture into the combustion chamber 12 along with air from the air flow path 18. When the air assist is no longer required, the valve 42 may be closed at which time air will be directed through the fuel/air nozzle 26 into the combustion chamber 12 solely from the air flow path 18.

As previously mentioned, the combustor 10 will have a plurality of fuel injectors 24 associated with the combustor wall 14 and disposed about the combustor wall 14 substantially as shown schematically in FIG. 1. Each of the fuel injectors 24 will include a fuel/air nozzle or opening 26 in communication with the air flow path 18 together with a fuel nozzle or supply tube 28 opposite the opening 26 and each of the fuel nozzles or supply tubes 28 will be in communication with the fuel manifold 22 and disposed in a manner so as to direct fuel from the source through the respective one of the openings 26 in the combustor wall 14. While the fuel manifold head will produce pressure variations thereabout, the air assist tubes 34 cooperate with the fuel metering orifices 30 to cause uniform fuel distribution in the combustion chamber 12.

Figure 3:
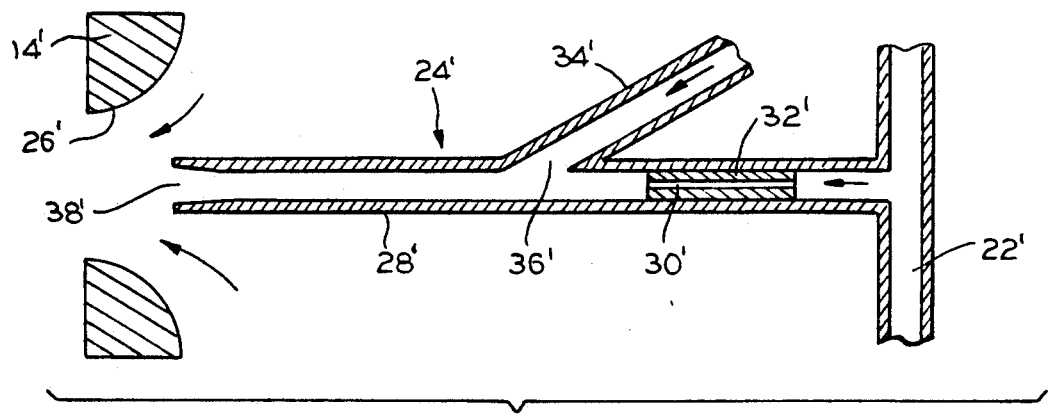
FIG. 3 is an enlarged cross section view illustrating details of a second embodiment of fuel injection system for a combustor.

Referring now to FIG. 3, an alternative embodiment of fuel injector 24' has been illustrated. The fuel injector 24' also includes a fuel/air nozzle or opening 26' in the combustor wall 14' as well as a fuel supply tube 28' in communication with a fuel manifold 22' and a fuel metering orifice 30' in a capillary tube 32', all of which correspond to the embodiment illustrated in FIG. 2. However, the air assist means in the fuel injector 24' is somewhat different.

In particular, the air assist means comprises an air assist tube 34' in direct communication with the fuel supply tube 28' and having an outlet end 36' opening into the fuel supply tube 28'. More specifically, the outlet end 36' of the air assist tube 34' opens into the fuel supply tube 28' upstream of the outlet end 38' and downstream of the fuel metering orifice 30' in the capillary tube 32'.

With either of the embodiments illustrated in FIGS. 2 and 3, the air assist tubes 34 and 34' serve a most important function as an assist to fuel injection by causing fuel acceleration. It will be appreciated from the foregoing that the air assist tubes 34 and 34' both serve in conjunction with the respective ones of the fuel metering orifices 30 and 30' in the capillary tubes 32 and 32' to accelerate metered fuel flow at low fuel flow rates such as those encountered at high altitude. As a result, the present invention has achieved the objective of making it possible to ensure starting reliability in combustors at high altitude in a most effective manner.

Still further, by rendering the air assist means selectively operable, the compressed air directed through the air assist tubes 34 and 34' can be discontinued following the combustor startup phase. In other words, the air assist may no longer be needed as the speed of the engine increases. Since the air assist means is selectively operable, the fuel injectors 24 and 24' are able to serve a dual role, i.e., they serve both as start injectors and as main injectors for a gas turbine engine.

In the illustrated embodiments, a capillary tube having a fuel metering orifice has been illustrated although an alternative should be noted. Specifically, it is also possible to utilize a conventional metering orifice. However, the capillary tube has been found to reduce fuel pressure while increasing metering orifice size in a most satisfactory manner.

In the case of the external air assist illustrated in FIG. 2, the air applies a suction at the end of the fuel supply tube. This causes the fuel to be "pulled out" at very high velocity. In the case of the internal air assist illustrated in FIG. 3, the fuel is accelerated to a very high velocity inside the fuel supply tube.

In essence, when the air assist is operative, a second orifice of very small size is, in principal, achieved downstream of the regular metering orifice. The greater the air assist, i.e., the higher the air pressure in the air assist tube, the smaller, in principal, the metering orifice. Hence, at low engine speeds, the manifold head effect can be corrected without using high fuel pressures or very small metering orifices.

While in the foregoing there have been set forth preferred embodiments of the invention, it will be appreciated that the details herein given may be varied by those skilled in the art without departing from the true spirit and scope of the appended claims.

We claim:

1. In a combustor for a turbine engine, said combustor having a combustion chamber defined by a combustor wall surrounded by a combustor case defining an air flow path therebetween, said air flow path being in communication with a source of compressed air, said combustor having a fuel injection system comprising a fuel manifold in communication with a plurality of fuel injectors associated with said combustor wall, the improvement comprising:

said fuel injectors each including an opening in said combustor wall in communication with said air flow path together with a fuel nozzle opposite said opening;

each of said fuel nozzles being in communication with said fuel manifold, each of said fuel nozzles being disposed in a manner so as to direct fuel from said source through the respective one of said openings in said combustor wall, each of said fuel nozzles including means for metering fuel flowing therethrough;

each of said fuel nozzles comprising a fuel supply tube disposed in coaxial relation to the respective one of said openings in said combustor wall, each of said fuel metering means controlling fuel flow through the respective one of said fuel supply tubes upstream of the respective one of said openings in said combustor wall; and air assist means associated with each of said fuel nozzles downstream of the respective one of said fuel metering means and in communication with said source of compressed air and operable to accelerate fuel through the respective one of said fuel nozzles upstream of the respective one of said openings in said combustor walls, each of said air assist means comprising an air assist tube disposed about the respective one of said fuel supply tubes, each of said air assist tubes being coaxial with and radially spaced from the respective one of said fuel supply tubes, each of said air assist tubes having an outlet end adjacent an outlet end of the respective one of said fuel supply tubes, and each of said air assist tubes being formed with the respective one of said outlet ends having a restricted cross-sectional area.

2. The combustor of claim 1 wherein each of said fuel metering means comprises a fuel metering orifice within the respective one of said fuel supply tubes.

3. The combustor of claim 1 wherein each of said fuel metering means comprises a capillary tube disposed within the respective one of said fuel supply tubes.

* * * * *